United States Patent [19]

Yeung

[11] Patent Number: 5,671,509

[45] Date of Patent: Sep. 30, 1997

[54] ROPE LOCK

[75] Inventor: Man Fu E. Yeung, Rowland Heights, Calif.

[73] Assignee: Sunco Products, Inc., Industry, Calif.

[21] Appl. No.: 665,570

[22] Filed: Jun. 18, 1996

[51] Int. Cl.⁶ .................................................. F16G 11/00
[52] U.S. Cl. ................................... 24/130; 24/115 R
[58] Field of Search ............................. 24/129 R, 130, 24/115 R, 115 H, 115 K; 114/218

[56] References Cited

U.S. PATENT DOCUMENTS

| | | | |
|---|---|---|---|
| 269,399 | 12/1882 | Ensign | 24/130 |
| 3,574,900 | 4/1971 | Emery | 24/130 |
| 3,952,376 | 4/1976 | Ellis | 24/255 AL X |
| 4,685,500 | 8/1987 | Silvia | 114/218 X |
| 5,351,366 | 10/1994 | Shaw | 24/136 R X |

FOREIGN PATENT DOCUMENTS 21740  10/1904  United Kingdom ..................... 24/129

*Primary Examiner*—James R. Brittain
*Attorney, Agent, or Firm*—Dominik & Stein

[57] ABSTRACT

A rope lock formed from of a single one-piece unit having a central bore and a groove portion that cooperate with each other in order to frictionly engage a line thereby releasably securing the line in a desired position whereupon no tying of the line is required and quick securement is ultimately achieved, the rope lock including a pliable boot to facilitate being mountable to flexible electronically weldable and heat-sealable materials.

5 Claims, 2 Drawing Sheets

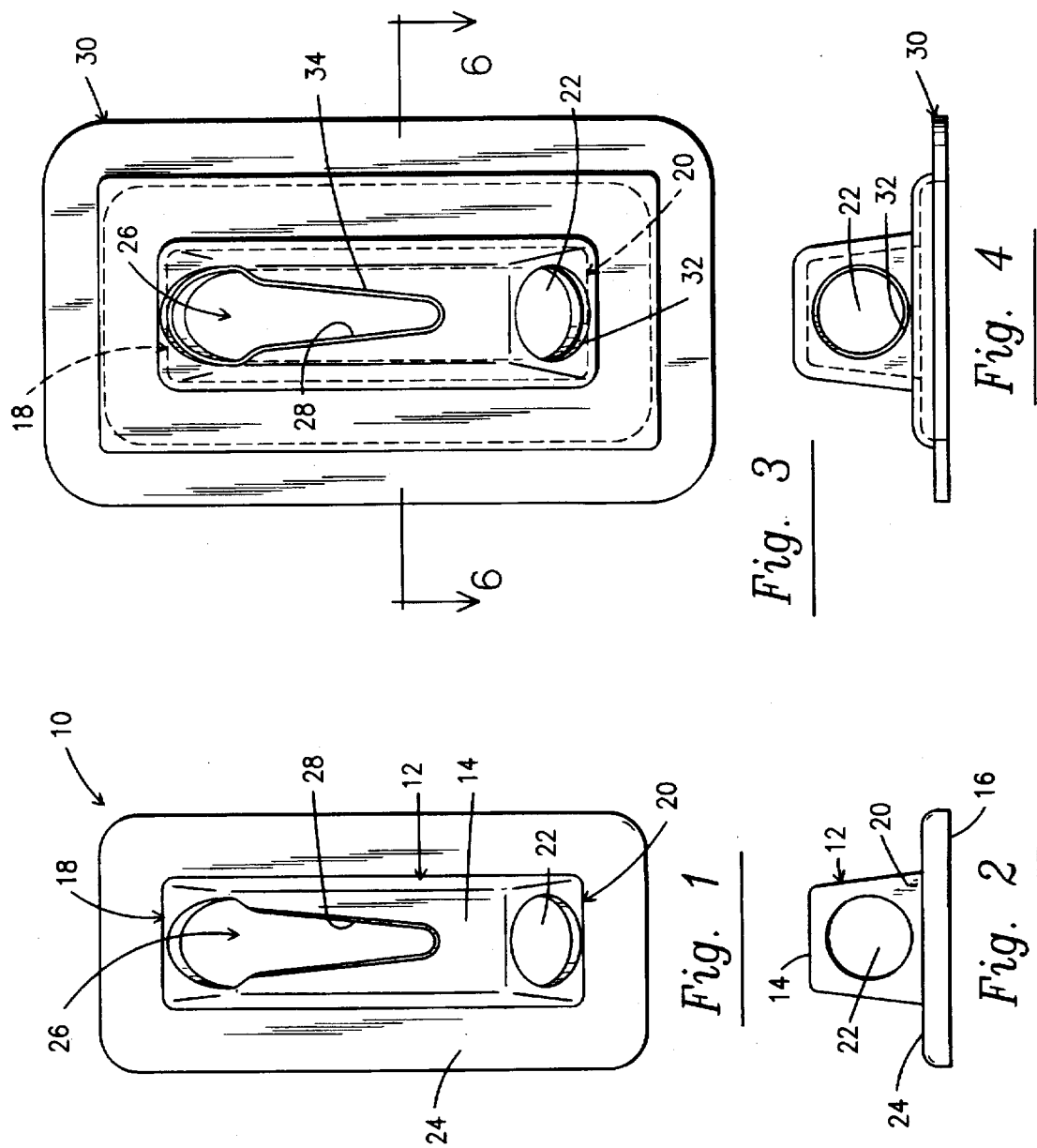

ROPE LOCK

BACKGROUND OF THE INVENTION

1. Field of the Invention

This invention relates to a rope lock and, more particularly, to a rope lock for use with devices utilizing a flexible line thereby facilitating the fastening of the line in a desired position.

2. Description of the Background Art

Presently, there are many types of rope lock devices available and in use today throughout the recreational and commercial industries. However, the present designs require a tying of the line or an assembling of various parts in order to secure the line. Further, the present designs can not be mounted to an inflatable device. Many of the prior art devices incorporate a pinching of the line creating an opposite force to the direction of the pull on the line. However, these types of devices all require the assembling of various parts that resultingly act together through movement to achieve the securing desired. For example, two cam-shaped pivoting heads being forced toward each other and thereby pinching the line due to the line being pulled therebetween. None of the rope locking devices in the industry today providing a single one-piece locking unit that releasably secures a line can be mounted to an inflatable device.

Therefore, it is an object of this invention to provide an improvement which overcomes the aforementioned inadequacies of the prior art devices and provides an improvement which is a significant contribution to the advancement of the rope fastening art.

Another object of this invention is to provide a rope lock that facilitates the quick releasable securing of a line in a desired position.

Another object of the present invention is to provide a rope lock wherein the line length can be easily adjusted and re-secured at a new position by way of pulling on the rope to release and then resetting at the desired position.

Another object of the present invention is to provide a rope lock that is comprised solely of a single unit piece having no moving parts.

Another object of the present invention is to provide a rope lock having a pliable outer boot so to provide a means for electronical or heat-welding the rope lock to an inflatable device such as a raft.

Another object of the present invention is to provide a rope lock that can receive and cooperate with lines having various respective diameters.

Another object of the present invention is to provide a rope lock for use with devices utilizing a flexible line facilitating the fastening of the line in a desired position, said rope lock comprising in combination: a main body having a top side, a bottom side, a first end and a second end; a central bore extending through said main body from said first end to said second end; and a gripping means for securing the line in a desired position, the gripping means being coupled to the main body intermediate to the first and second ends so as to cooperate with the central bore such that the line can be readily adjusted and re-secured without necessitating the movement of any parts and a pliable boot sized to cooperatively receive said main body and said flange portion of said rope lock, said pliable boot extending out over said flange portion to facilitate being coupled to the device thereby securing said rope lock encompassed within to the device, whereby the line passes through the central bore and into engagement with the gripping means cooperating therewith so to releasably secure the line to the main body.

The foregoing has outlined some of the pertinent objects of the invention. These objects should be construed to merely illustrative of some of the more prominent features and applications of the intended invention. Many other beneficial results can be obtained by applying the disclosed invention in a different manner or by modifying the invention within the scope of the disclosure. Accordingly, other objects and a more comprehensive understanding of the invention may be obtained by referring to the summary of the invention, and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. For the purpose of summarizing the invention, the invention comprises a rope lock having a main body wherein a central bore extends therethrough from a first end to a second end. Positioned on the main body adjacent the central bore and in cooperation therewith, is a gripping means for securing the line in a desired position after passing through the central bore. The gripping means is generally comprised of an integral groove positioned on the top side of the main body. The integral groove is in communication with the central bore such that the line passes through the central bore and out the groove. The groove has a decreasing width as you progress from the first end toward the second end of the main body.

The rope lock of the present invention is generally formed of a single unit piece that is received and cooperatively seated within a pliable boot which facilitates coupling the rope lock to a device.

An important feature of the present invention is that the rope lock is comprised of a single unit piece that simplifies the manufacture thereof and the costs associated therewith.

Another important feature of the present invention is that the rope lock has no moving parts thereby providing a device that is less likely to fail due to parts malfunctioning.

Another important feature of the present invention is that the rope lock provides for the easy quick releasable securing of a line in a desired position by way of frictionally engaging the line.

Another important feature of the present invention is that the rope lock can be mounted on inflatable devices by way of a pliable boot which conformably covers the rope lock and secures it to the respective device.

Therefore, it can be readily appreciated that the present invention precludes the need for a multiple-part device for securing a line that involves tying the line in a lengthy procedure as well as provide a rope lock that can be mounted on devices formed of thin flexible materials.

The foregoing has outlined rather broadly, the more pertinent and important features of the present invention. The detailed description of the invention that follows is offered so that the present contribution to the art can be more fully appreciated. Additional features of the invention will be described hereinafter. These form the subject of the claims of the invention. It should be appreciated by those skilled in the art that the conception and the disclosed specific embodiment may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more succinct understanding of the nature and objects of the invention, reference should be directed to the following detailed description taken in connection with the accompanying drawings in which:

FIG. 1 is a top plan view of the rope lock illustrating the relative positions of the central bore, the integral groove, the main body and the flange portion relative to each other;

FIG. 2 is an end elevational view of the rope lock illustrating the main body, the center bore and the flange portion in their relative positions to each other;

FIG. 3 is a top plan view of the rope lock with the pliable boot in position covering the main body and flange portion;

FIG. 4 is an end elevational view of the rope lock with the pliable boot thereon illustrating the pliable boot's cooperation with the central bore and the main body;

Similar reference characters refer to similar parts throughout the several views of the drawings.

DETAILED DESCRIPTION OF THE PREFERRED EMBODIMENT

Figure 5:
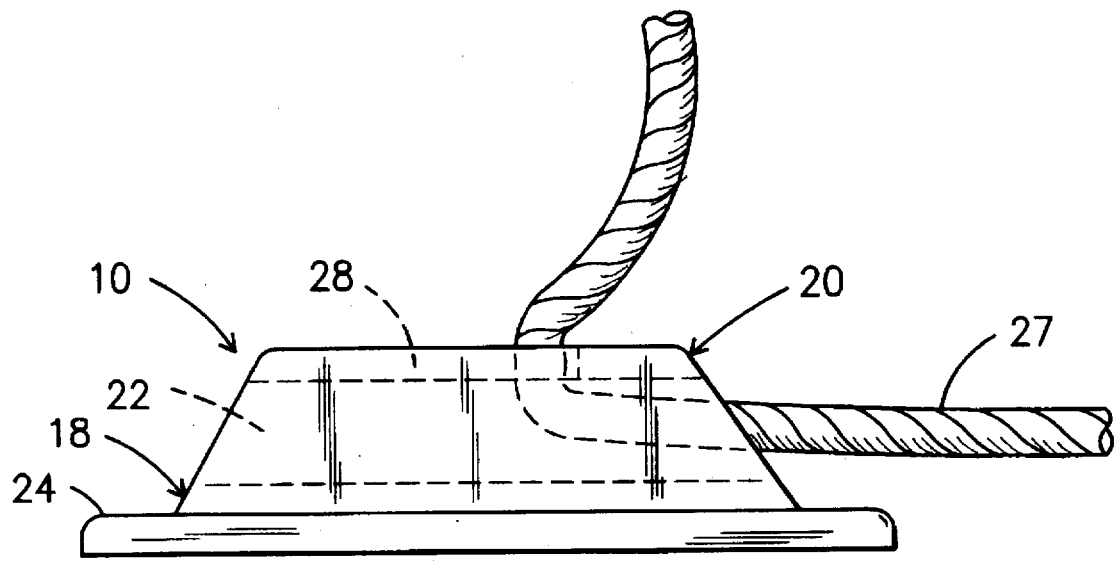
FIG. 5 is a side elevational view of the rope lock illustrating the slanted first and second ends of the main body and the relative positions of the central bore and the integral groove relative to each other.

In referring to FIGS. 1 and 2, the rope lock 10 can be seen in a top plan view and a side elevational view, respectively. The rope lock 10 is comprised of a main body 12 having a top side 14, a bottom side 16, a first end 18, and a second end 20. The main body 12 is elongated in shape having a longitudinal axis. A central bore 22 extends through the main body 12 along the longitudinal axis. Extending horizontally outward from the bottom side 16 of the main body 12 is a flange portion 24 which serves to provide stability in the rope lock 10. The flange portion 24 also facilitates the mounting of the rope lock 10 to a device. It is preferable that the rope lock 10 be formed from a rigid high-strength material so to withstand pulling forces exerted by a secured line or rope.

In referring now to FIGS. 1, 3 and 5, the first and second ends 18 and 20 of the main body are seen to be slanted outward. The ends 18 and 20 are slanted outward as you progress from the top side 14 to the bottom side 16 such that the top side 14 is shorter in length than the bottom side 16. The first and second ends 18 and 20 are slanted so as to decrease the amount of sharp angles presented by the rope lock 10.

A gripping means, generally referenced by numeral 26, is positioned on the top side 14 of the main body 12 intermediate to the first and second ends 18 and 20 (see FIGS. 1 and 3). The gripping means 26 is positioned so as to cooperate with the central bore 22 such that a line 27 passing through the central bore 22 will extend out the gripping means 26. The gripping means 26 is comprised of a groove portion 28 extending from the first end 18 to an intermediate point between the first and second ends 18 and 20.

The groove portion 28 is seen to have a decreasing width as you progress from the first end 18 toward the second end 20. The groove portion 28 decreases in width as it nears the intermediate point between the first and second ends 18 and 20 to such a degree as to be less than the diameter of the line 27 being secured to the rope lock 10. Hence, the line 27 becomes pinched and frictionally engaged within the groove portion 28 as it slides along the groove towards the second end 20 of the main body 12 (see FIG. 5). Therefore, when secured to the rope lock 10, the line 27 forms a U-shaped curve by entering the main body 12 via the central bore 22 at the second end 20 and exits the main body 12 via the groove portion 28 whereupon the line 27 is pulled along the groove portion 28 back toward the second end 20.

Figure 6:
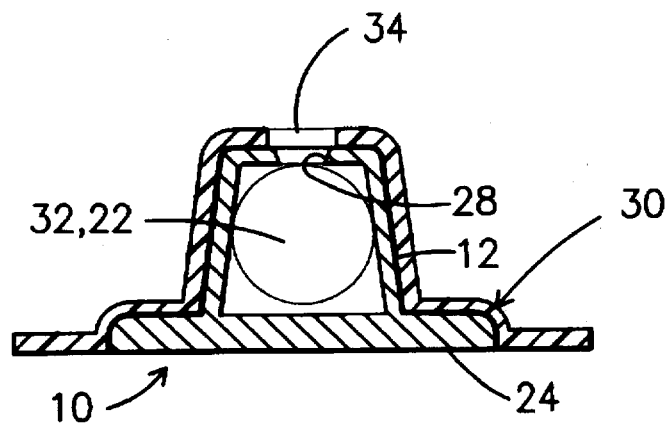
FIG. 6 is a cross-sectional view taken along the line 6—6 as depicted in FIG. 3 illustrating the pliable boot in position over the main body and flange portion of the rope lock.

In now referring specifically to FIGS. 3, 4 and 6, a pliable boot 30 can be seen in position relative to the rope lock 10. The pliable boot 30 is positioned over the rope lock 10 thereby providing for the capability of being mounted to inflatable devices formed of flexible air-tight materials. Further, the pliable boot 30 extends radially outward past the flange portion 24 so as to facilitate securing the rope lock 10 to devices formed from flexible electronically-weldable or heat-sealable materials such as polyvinyl chloride (PVC). Thus, the pliable boot 30, which encompasses the rope lock 10 within, is electronically welded to the device thereby securing the rope lock 10 to the device.

In now referring specifically to FIG. 5, the pliable boot 30 can be better understood in its relation to the rope lock 10. The pliable boot 30 is sized to conformly receive the rope lock 10 within and cooperate therewith. The central bore 22 and the groove portion 28 are readily accessed through the pliable boot 30 by way of a hole 32 and a slot 34 positioned so as to cooperatively align with the central bore 22 and groove portion 28, respectively (see also FIGS. 3 and 4). The pliable boot 30 is preferably formed from a polyurethane material suitable for covering a rigid structure and maintaining a preformed shape.

Now that the structure of the present invention has been described in detail, its operation may be readily understood. The rope lock 10 is used by way of inserting a line 27 through the central bore 22 starting at the second end 20 of the main body 12 such that the line 27 exits the main body 12 via the groove portion 28 positioned in the top side 14. The line 27 exits out of the main body 12 near the first end 18 adjacent the widest point of the groove portion 28. Next, the line 27 is continually pulled through the main body 12 of the rope lock 10 until a desired line length is obtained whereupon the excess line 27 extending out of the groove portion 28 is pulled along the groove portion 28 toward the second end 20 until the line 27 is pinched and frictionally engaged by the groove portion 28 due to its decreasing width.

Once the line 27 has been secured at a desired length, the line 27 may then be subsequently disengaged from the groove portion 28 by pulling the portion of the line 27 extending out of the groove portion 28 toward the first end 18 of the main body 12. Once the line 27 has been disengaged, the line 27 may then be readjusted to a new desired length. When a new desired length is achieved, the line 27 is once again pulled toward the second end 20 of the main body 12 to thereby forcibly pinch and frictionally engage the line 27 within the groove portion 28. In order to completely release the line 27 from the rope lock 10, the line 27 is disengaged from the groove portion 28 by pulling the portion of the line 27 extending out of the groove portion 28 toward the first end 18 of the main body 12 and allowing the line 27 to slide back through the central bore 22 until the line 27 is completely passed through.

The present disclosure includes that contained in the appended claims, as well as that of the foregoing description. Although this invention has been described in its preferred form with a certain degree of particularity, it should be understood that the present disclosure of the preferred form has been made only by way of example and that numerous changes in the details of construction and the combination and arrangement of parts may be resorted to without departing from the spirit and scope of the invention.

Now that the invention has been described, what is claimed is:

1. A rope lock for use with devices utilizing a flexible line facilitating the fastening of the line in a desired position, said rope lock comprising in combination:

a main body having a top side, a bottom side, a flange portion, a first end and a second end;

a central bore extending through said main body from said first end to said second end; and a gripping means for securing the line in a desired position, said gripping means being coupled to said main body intermediate to said first and second ends so as to cooperate with said central bore such that the line can be readily adjusted and re-secured without necessitating the movement of any parts; and a pliable boot sized to cooperatively receive said main body and said flange portion of said rope lock, said pliable boot extending out over said flange portion to facilitate being coupled to the device thereby securing said rope lock encompassed within to the device, whereby the line passes through said central bore and into engagement with said gripping means cooperating therewith so to releasably secure the line to said main body.

2. The rope lock as recited in claim 1, wherein said gripping means is comprised of an integral groove positioned in said main body in communication with said central bore, said groove having a decreasing width from said first end towards said second end so to frictionally engage the line as the line slides along said groove towards said second end after passing through said central bore.

3. The rope lock as recited in claim 1, wherein said main body further includes said flange portion extending horizontally outward from said bottom side to facilitate the securing of said rope lock to the device.

4. The rope lock as recited in claim 1, wherein said pliable boot further includes a hole and a slot, said hole being positioned so to align with said central bore and said slot positioned so to align with said groove when said rope lock is received by said pliable boot.

5. The rope lock as recited in claim 1, wherein said main body is elongated in shape and said first and second ends are slanted outward from said top side to said bottom side.

* * * * *